United States Patent
Moser et al.

(10) Patent No.: US 7,334,014 B2
(45) Date of Patent: Feb. 19, 2008

(54) CONSISTENT TIME SERVICE FOR FAULT-TOLERANT DISTRIBUTED SYSTEMS

(75) Inventors: Louise E. Moser, Santa Barbara, CA (US); Peter M. Melliar-Smith, Santa Barbara, CA (US); Wenbing Zhao, Goleta, CA (US)

(73) Assignee: Availigent, Inc., San Jose, CA (US)

( * ) Notice: Subject to any disclaimer, the term of this patent is extended or adjusted under 35 U.S.C. 154(b) by 936 days.

(21) Appl. No.: 10/751,264

(22) Filed: Jan. 2, 2004

(65) Prior Publication Data

US 2004/0205372 A1 Oct. 14, 2004

Related U.S. Application Data

(60) Provisional application No. 60/437,762, filed on Jan. 3, 2003.

(51) Int. Cl.
*G06F 15/16* (2006.01)
(52) U.S. Cl. ............ 709/202; 709/223; 713/500; 713/502; 714/814
(58) Field of Classification Search ............ 709/202, 709/223–224; 713/400, 500–502, 600; 714/798–799, 714/814
See application file for complete search history.

(56) References Cited

U.S. PATENT DOCUMENTS

| 4,683,570 | A | * | 7/1987 | Bedard et al. ............ 714/797 |
| 5,636,373 | A | * | 6/1997 | Glendening et al. ........ 713/400 |
| 6,349,325 | B1 | * | 2/2002 | Newcombe et al. ........ 709/202 |
| 6,360,329 | B1 | * | 3/2002 | Kinkade .................. 713/502 |
| 2002/0188711 | A1 | * | 12/2002 | Meyer et al. ............. 709/223 |

\* cited by examiner

*Primary Examiner*—Bharat Barot
(74) *Attorney, Agent, or Firm*—John P. O'Banion

(57) ABSTRACT

A consistent time service that provides a method of maintaining deterministic clock-related operations for a group of replicas in a fault-tolerant distributed system. A consistent clock synchronization algorithm is utilized that yields a single consistent group clock for the replicas in the group, and does not require synchronization of the underlying physical hardware clocks. The consistent group clock ensures the determinism of the replicas in the group with respect to clock-related operations, is monotonically increasing, has bounded increment, skew and drift. The consistent time service provides benefits for active replication during normal operation, as well as passive replication and semi-active replication to ensure a consistent monotonically increasing clock when the primary replica fails and a backup replica takes over as the new primary replica. The consistent time service provided is transparent to the application and guarantees group clock consistency despite replica failures or adding new or repaired replicas.

42 Claims, 8 Drawing Sheets

CONSISTENT TIME SERVICE FOR FAULT-TOLERANT DISTRIBUTED SYSTEMS

CROSS-REFERENCE TO RELATED APPLICATIONS

This application claims priority from U.S. provisional application Ser. No. 60/437,762 filed on Jan. 3, 2003, incorporated herein by reference in its entirety.

STATEMENT REGARDING FEDERALLY SPONSORED RESEARCH OR DEVELOPMENT

This invention was made with Government support under Grant No. 70NANBOH3015, awarded by the US Department of Commerce, National Institute of Standards & Technology. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention relates generally to methods of maintaining replica consistency and more particularly to methods of maintaining a consistent view of time for a group of replicas in a fault-tolerant distributed system, wherein each processor has a physical hardware clock and the replicated application program contains clock-related operations.

2. Description of Related Art

One of the biggest challenges of replication-based fault tolerance is maintaining replica consistency in the presence of replica non-determinism (see, D. Powell, editor, "Delta-4: A Generic Architecture for Dependable Distributed Computing", Springer-Verlag, 1991, incorporated herein by reference). For active replication, it has been recognized that the replicas must be deterministic, or rendered deterministic. Consequently, passive replication, based on the primary/backup approach, has been advocated if the potential for replica non-determinism exists; however, the same replica non-determinism problems that arise for active replication during normal operation arise for passive replication when the primary replica fails.

Clock-related operations, such as invoking the method gettimeofday( ), are one source of replica non-determinism. Clock-related operations are common not only in real-time applications but also in non-real-time applications, such as in the following two examples: (1) the physical hardware clock value is used as the seed of a random number generator to generate unique identifiers such as object identifiers or transaction identifiers; and (2) the physical hardware clock value is accessed when a timeout is required, for example, for timed remote method invocations to prevent extensive delays and by transaction processing systems in two-phase commit and transaction session management.

Although the primary/backup approach solves the consensus problem for individual clock readings of replicas in a group of replicas, it does not guarantee that the clock readings will always advance forward. If the primary replica that determines the clock readings for the group of replicas crashes, the newly selected primary starts with its own physical hardware clock value for the next clock reading. Because of the differences in the two physical hardware clocks, and the gap in time of the computation for the two replicas, the next clock reading might be earlier than the previous clock reading of the primary replica before it crashed. Clock roll-back can break the causal relationships between events in the distributed system, and can lead to undesirable consequences for the replicated application.

It might also happen that two consecutive clock readings from two different replicas (due to the failure of the original replica) differ too much in the other direction; that is, the second clock reading is too far ahead of the first clock reading. The presence of this fast-forward behavior can lead to unnecessary time-outs in the replicated application.

The clock roll-back and fast-forward problems associated with the primary/backup approach can be alleviated by closely synchronizing the physical hardware clocks. Clocks can be synchronized in a fairly accurate manner using software-based solutions such as the Network Time Protocol (NTP) or hardware-based solutions such as Global Positioning Satellite (GPS) clocks. However, even exact clock synchronization does not solve the problem of maintaining consistent clocks at the replicas. Note that the fast-forward behavior rarely happens for semi-active replication (discussed herein) because the backup replicas lag behind the primary replica that determines the clock value, assuming that the clocks are synchronized closely enough (see, P. Verissimo, "Ordering and timeliness requirements of dependable real-time programs", Journal of Real-Time Systems, 7(2):105-128, 1994, incorporated herein by reference).

For distributed applications that run on commercial-off-the-shelf general-purpose operating systems, such as Solaris, Linux or Windows, traditional physical hardware clock synchronization algorithms cannot solve the replica non-determinism problem for clock-related operations. Such traditional clock synchronization algorithms can be found in L. Lamport and P. M. Melliar-Smith, "Synchronizing clocks in the presence of faults", Journal of the ACM, 32(1):52-78, 1985, incorporated herein by reference; L. Rodrigues, P. Verissimo, and A. Casimiro, "Using atomic broadcast to implement a posteriori agreement for clock synchronization", in Proceedings of the IEEE 12th Symposium on Reliable Distributed Systems, pages 115-124, Princeton, N.J., October 1993, incorporated herein by reference; T. K. Srikanth and S. Toueg, "Optimal clock synchronization", Journal of the ACM, 34(3):626-645, 1987, incorporated by reference; and P. Verissimo and L. Rodrigues, "A posteriori agreement for fault-tolerant clock synchronization on broadcast networks", in Proceedings of the IEEE 22nd International Symposium on Fault-Tolerant Computing, pages 527-536, Boston, Mass., July 1992, incorporated herein by reference. One reason that traditional clock synchronization algorithms do not suffice is that such algorithms provide only approximate clock synchronization. Another reason is that the replicas in the group of replicas can read different clock values when they process the same request at different real times due to asynchrony in replica processing and/or scheduling, as shown in FIG. 1. This problem is intrinsic to event-triggered systems, no matter how accurately the clocks are synchronized.

To guarantee replica consistency in the presence of clock-related non-determinism, fault-tolerant systems, such as Mars (see, H. Kopetz, A. Damm, C. Koza, M. Mulazzani, W. Schwabl, C. Senft, and R. Zainlinger "Distributed fault-tolerant real-time systems: The Mars approach", IEEE Micro, pages 25-40, February 1989, incorporated herein by reference) have used a lock-step, time-triggered approach. However, the time-triggered approach is not applicable in all circumstances, due to its requirement of a priori scheduling of the operations of the replicated application. In particular, a program cannot read the clock time because no mechanism is provided to ensure precise consistency of the readings of the clocks.

In S. Mullender, editor, "Distributed Systems", ACM Press, second edition, 1993, incorporated herein by reference, a pre-processing approach has been proposed to render deterministic the computations of the replicas. The pre-processing involves executing a distributed consensus protocol to harmonize the inputs from the environment. In particular, the primary/backup approach is used to cope with non-deterministic reading of clocks for a group of replicas. The physical hardware clock value of the primary replica is returned, and the result is conveyed to all of the backup replicas. The other replicas utilize that clock value, instead of their own physical hardware clock values.

U.S. Pat. No. 5,001,730, which is incorporated herein by reference, describes a distributed clock synchronization algorithm for address-independent networks. Synchronization is achieved by using the fastest clock in the network as the master clock against which all other clocks in the network are synchronized. Each node sends a message to all of the other nodes in the network when its timer times out. If a node receives a message with a higher clock time than its own before it sends a message, that node does not send its message. However, no mechanism is provided to ensure that all nodes receive the same message first and, thus, that patent does not ensure consistent readings of the clocks.

U.S. Pat. No. 5,041,966, which is incorporated herein by reference, defines three partially distributed methods for performing clock synchronization. The general concept is that randomly selected M processors out of N processors cooperate to adjust the clocks of all processors in the distributed system. In the first method all processors randomly select M processors at different time instants, and each processor adjusts its clock to an average of the local times of the M processors. In the second method each processor transmits its own local time to randomly selected M processors and adjusts its own clock to the average of the local times it receives. In the third method all processors adjust their clocks to the average of the local times received from randomly selected M processors. The methods consider fault tolerance, but they make no attempt to ensure consistent readings of the clock.

U.S. Pat. No. 5,530,846, which is incorporated herein by reference, describes a method for accommodating discrete clock synchronization adjustments, while maintaining a continuous logical clock that amortizes the adjustments at a predetermined rate. Two logical clocks are used to decouple clock synchronization from clock amortization. One logical clock is discretely synchronized to an external time reference, and a second logical clock is adjusted with amortization to provide a continuous monotonically non-decreasing logical clock. Again, the method makes no attempt to ensure consistent readings of the clock.

U.S. Pat. No. 5,689,688, which is incorporated herein by reference, describes two methods for synchronizing local times, maintained at nodes within a network, with a reference time. The active method is a handshaking scheme in which synchronization is initiated by the node requiring synchronization and involves an exchange of messages between the node and the reference time source, producing a synchronized time and a maximum error. The passive method involves a reference time source that broadcasts a burst of reference-time synchronization messages; a node listens for the messages, updating its local time and maximum error. Individual nodes are synchronized independently and there is no mechanism to ensure consistent readings of the clock.

U.S. Pat. No. 6,157,957, which is incorporated herein by reference, describes a clock synchronization system and method for a communication network, consisting of multiple nodes that transfer data over communication links. The nodes exchange timing information with a master node that has a master clock against which the local clocks of the nodes are to be synchronized. At predefined moments in time, each node exchanges timing information with the master node, calculates timing data and stores the timing data in a sequence of timing data, called its history. After at least two exchanges, the method calculates parameters from the history, stores them and uses them to compute a continuous conversion function. The continuous conversion function converts the local time into the master time with a pre-specified and guaranteed precision that is nevertheless only approximate. No mechanism is provided to guarantee consistent readings of the clock.

FIG. 1A shows two replicas, R1 10 and R2 12, that both process the same messages and are required to maintain consistency between their states, their processing and their results. Each replica is supported by a replication infrastructure 14, 16, and each such infrastructure contains a queue of unprocessed messages 18, 20. Because of communication delays and differences in processing speeds, the two replicas do not perform the same operations at exactly the same real time. In FIG. 1A, replica R1 is processing 22 request message number 5 while replica R2 is still processing 24 request message number 3 when request message number 8 is received and queued at both replicas R1 and R2 26, 28. Even though request message number 8 is received simultaneously at both replicas, the message is likely to be processed at different real times by the two replicas.

In FIG. 1B, the processing of request message number 8 invokes the gettimeofday( ) method 34, 36 of the operating system to read the physical hardware clock. Because the two replicas R1 30 and R2 32 process the request message at different real times, the replicas can receive different values for the time from the gettimeofday( ) method, even if the two clocks are perfectly synchronized. If the two replicas process two different values for the time, their states and results can diverge, thus destroying replica consistency. It is essential that the gettimeofday( ) methods in the two replicas yield exactly the same values for the time, even if their corresponding physical hardware clock readings yield different real times.

Therefore, a need exists, as outlined above, for a method of providing a consistent time service for fault-tolerant distributed systems based on replication in order to maintain replica consistency. The present invention satisfies those needs, as well as others, and overcomes clock-related sources of replica non-determinism and replica inconsistency.

BRIEF SUMMARY OF THE INVENTION

Clock-related operations are one of the many sources of replica non-determinism and replica inconsistency in fault-tolerant distributed systems. In passive replication, if the primary server crashes, the next clock value returned by the new primary server, when it continues the computation, might have actually rolled back in time, which can lead to undesirable consequences for the replicated application. The same problem can arise for active replication where the result of the first replica to respond is taken as the next clock value, and that value might be smaller than the value chosen for the prior clock value.

In response to these needs, the present invention provides a consistent time service for fault-tolerant distributed systems that are based on replication. The consistent time service ensures deterministic clock-related operations for a group of replicas, based on a consistent clock synchronization algorithm that provides a single group clock for the replicas in the group. It does not require synchronization of the physical hardware clocks. The consistent group clock is monotonically increasing and ensures that all of the replicas see the same clock values and the same behavior for clock-related operations. Assuming that the processing time and message delivery time are bounded, and that the physical hardware clocks have bounded increment and bounded drift, the consistent group clock also has bounded increment, bounded skew and bounded drift.

The consistent time service ensures a consistent monotonically increasing clock, not only for active replication during normal operation, but also for passive replication and semi-active replication when the primary fails and a backup replica takes over as the new primary. The consistent time service is transparent to the application and is fault-tolerant; that is, it allows the addition of new replicas and the recovery of failed replicas, without losing the properties of the group clock.

In one embodiment of the invention, a method of maintaining clock consistency in a fault-tolerant distributed system for a group of replicas each having a physical hardware clock comprises (a) executing a time service handler for accessing the physical hardware clock; (b) establishing a single group clock value within the time service handler for the group of replicas; and (c) returning from the time service handler with the group clock value instead of the physical hardware clock value at each replica.

In another embodiment of the invention, a method of maintaining clock consistency for a group of replicas, each having a physical hardware clock and operating in a fault-tolerant distributed system, comprises (a) reading a physical clock value by a given replica as a result of a clock operation; (b) determining a local logical clock value for the given replica by adding a clock offset value (positive or negative) to the physical clock value; (c) proposing the local logical clock value as the group clock value by sending a clock synchronization message containing that value to replicas in the group when no other clock synchronization message for this reading of the physical clock value has been received; (d) extracting the local logical clock value from the received clock synchronization message as the group clock value; (e) setting the clock offset value for the given replica to the value of the group clock value less the physical clock value; and (f) returning the group clock value to the given replica.

It should be recognized from the foregoing that the present invention provides a number of beneficial aspects.

An object of the present invention is to provide a method of maintaining a consistent view of time within replicas executing in a fault-tolerant distributed system.

Another object of the present invention is to provide a consistent group clock value to all replicas within a group of replicas.

Another object of the present invention is for a replica to maintain a time offset value representing the relationship between a received group clock value and the physical hardware clock value of the replica.

Another object of the present invention is to communicate the group clock value by sending that value within a consistent clock synchronization message that is multicast to replicas within the group of replicas.

Another object of the present invention is that replicas within a group of replicas, subject to an active replication strategy, compete for being the synchronizer that establishes the group clock value.

Another object of the present invention is that a primary replica within a group of replicas, subject to a passive replication strategy, determines the group clock value.

Further objects and advantages of the invention will be brought out in the following portions of the invention, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1A:
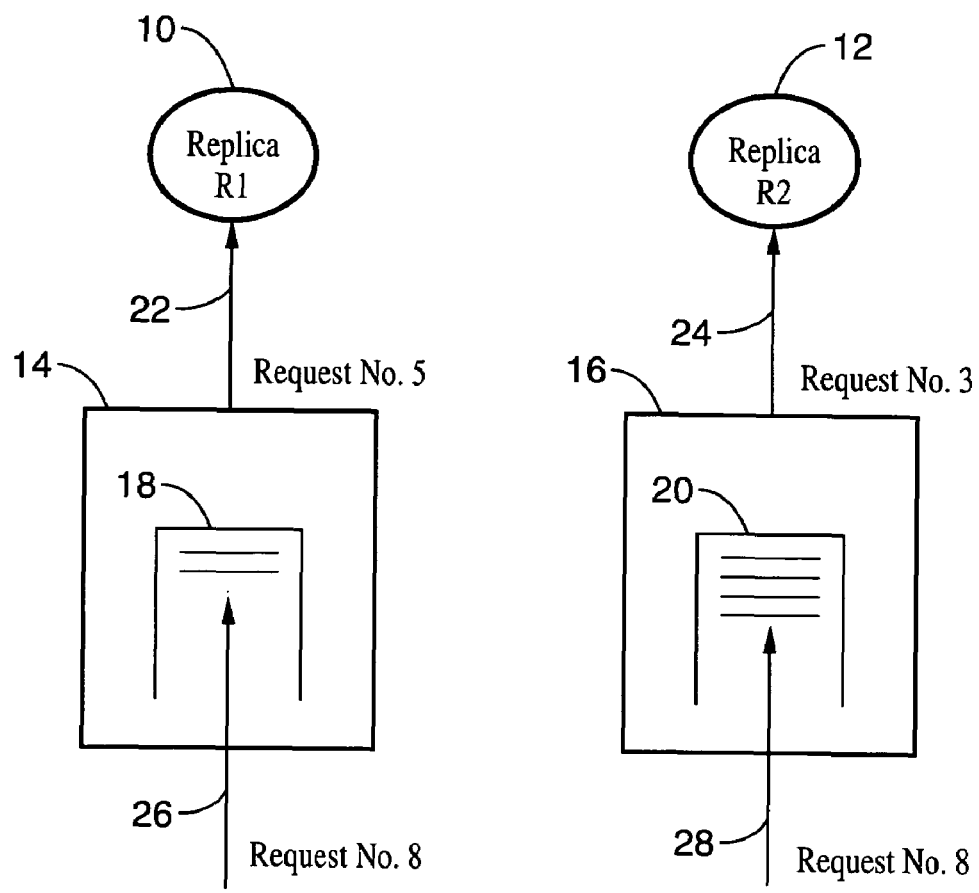
FIG. 1A and FIG. 1B are diagrams exemplifying the current problems associated with executing clock-related operations on different replicas at different real times.
Figure 1B:
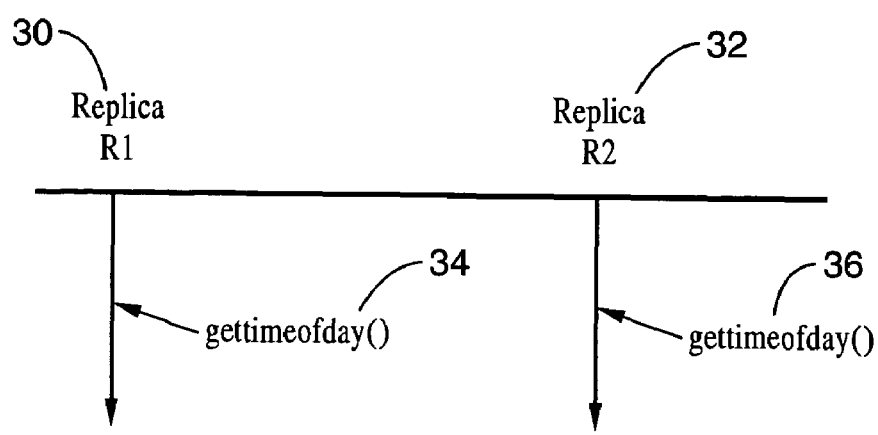

Referring more specifically to the drawings, for illustrative purposes the present invention is embodied in the apparatus generally shown in FIG. 2 through FIG. 8. It will be appreciated that the apparatus may vary as to configuration and as to details of the parts, and that the method may vary as to the specific steps and sequence, without departing from the basic concepts as disclosed herein.

1. Introduction

The consistent time service that is the subject of this invention applies to active replication and to the primary/backup approach used by cold and warm passive replication and by semi-passive and semi-active replication. In active replication, all of the replicas are equal (there are no primary or backups replicas), and all of the replicas transmit the messages containing the requests and replies, receive the messages, and process the requests and replies concurrently.

In warm passive replication, the application program is loaded into memory at the backup replicas, but the backup replicas do not process the messages containing the requests and replies; rather the messages are logged at the backup replicas and periodically the state of the primary replica is transferred to the backup replicas. In cold passive replication, the application program is not even loaded into memory at the backups and the messages are logged but not necessarily at the location at which the application program might subsequently be loaded into memory. In semi-passive replication, the application program is loaded into memory at the backups and the messages are logged at the backups, but the state is not transferred from the primary replica to the backup replicas. In semi-active replication, the application program is loaded into memory at the backup replicas and the backup replicas process the messages just as the primary replica does, but they do not communicate the requests or replies.

The consistent time service is implemented on top of a replication infrastructure and a group communication system (see, e.g., L. E. Moser, P. M. Melliar-Smith, D. A. Agarwal, R. K. Budhia and C. A. Lingley-Papadopoulos, "Totem: A fault-tolerant multicast group communication system, Communications of the ACM", vol. 39, no. 4, April 1996, pp. 54-63, incorporated herein by reference). The reliable ordered multicast protocol of the group communication system ensures that the replicas receive the same messages in the same order, and that a message is either delivered to all of the replicas in the group or to none of them. The membership algorithm of the group communication system maintains a consistent view of the group of replicas by all members of the group. The consistent time service applies to both asynchronous and synchronous distributed systems that provide these message delivery and membership services.

The consistent time service of the present invention preferably employs library interpositioning of clock-related system calls to achieve application transparency, although it may be implemented by other convenient means without departing from the teachings of the present invention.

The consistent time service depends on a consistent clock synchronization algorithm, described herein, which proceeds in rounds. The consistent clock synchronization algorithm presents a consistent view of the clocks for the replicas in the group and, hence, the application at each replica sees a consistent group clock instead of the inconsistent physical hardware clocks of the replicas.

The replicas are assumed to be fail-stop, as are the physical clocks; that is, a non-faulty replica never sends a wrong clock value to the other replicas. The fail-stop assumption for physical clocks might seem to be overly restrictive. In fact, most group communication systems operate only if the physical clocks are fail-stop. Arbitrary fault models for physical clocks can disrupt the timeout-based fault detection strategy that the group communication system uses.

If a replica is detected to be faulty, it is removed from the membership of the group. The failure of a replica does not interfere with the execution of the consistent clock synchronization algorithm. Communication faults are handled and masked by the underlying group communication system, i.e., the consistent clock synchronization algorithm assumes a reliable communication channel. At least one replica in the group is assumed to be non-faulty during a round of the clock synchronization algorithm.

All threads that perform clock-related operations are created during the initialization of a replica, or during runtime, in the same order at different replicas. Except for timer management, one and only one thread is assigned to process incoming remote method invocations, to send nested remote method invocations and to handle the corresponding replies.

We let $gc(n)$ denote the group clock value at round n, where $n>=1$. We let $pc(i, n)$ denote the reading of the physical hardware clock of replica i at the start of round n, where $n>=1$. We let $\Delta(i, n)$ denote the offset between the group clock value and the physical hardware clock value of replica i, i.e., $\Delta(i, n)=gc(n)-pc(i, n)$, $n>=1$, and we set $\Delta(i, 0)=0$. We let $lc(i, n)$ denote the local logical clock that replica i proposes for the group clock for round n, where $n>=1$. In the consistent clock synchronization algorithm, $lc(i, n+1)=pc(i, n+1)+\Delta(i, n)$ and, thus, $lc(i, 1)=pc(i, 1)$.

The values of the physical hardware clocks may differ from real time, but if the physical hardware clocks satisfy the following property, then the group clock satisfies the corresponding property.

Monotonically Increasing. The physical hardware clocks of the replicas are monotonically increasing, i.e., for all rounds n and for all replicas i at rounds n and n+1, $pc(i, n+1)>pc(i, n)$.

In addition, if the processing time and message delivery time are bounded and the physical hardware clocks satisfy the following properties, then the group clock satisfies corresponding boundedness properties.

Bounded Increment. The physical hardware clocks of the replicas have a bounded increment, i.e., there exists an I such that, for all rounds n and for all replicas i at rounds n and n+1, $pc(i, n+1)-pc(i, n)<I$.

Bounded Drift. The physical hardware clocks of the replicas advance at approximately the same rate, i.e., there exists a D such that, for all rounds n and for all replicas i and j at rounds n and n+1, $|[pc(i, n+1)-pc(i, n)]-[pc(j, n+1)-pc(j, n)]|<D$.

From the definition of the local logical clocks at the replicas and the monotonically increasing property of the physical hardware clocks of the replicas given above, it follows that the group clock satisfies the following properties:

Consistency. All of the non-faulty replicas in the group at round n receive the same group clock $gc(n)$, even if a fault occurs.

Monotonically Increasing. The group clock at round n+1 is greater than the group clock at round n, i.e., gc(n+1)>gc(n).

If, in addition, the processing time and message delivery time are bounded and the physical hardware clocks satisfy the bounded increment and bounded drift properties given above, then the group clock satisfies the following properties:

Bounded Increment. The group clock has bounded increment, i.e., there exists an I' such that, for all rounds n, gc(n+1)−gc(n)<I'.

Bounded Skew. The group clock has bounded skew in that the difference between the local clock that replica i proposes for the group clock and the consistent group clock is bounded, i.e., there exists an S' such that, for all rounds n and for all replicas i at round n, |lc(i, n)−gc(n)|<S'.

Bounded Drift. The group clock has bounded drift in that the physical hardware clock at replica i and the group clock advance at approximately the same rate, i.e., there exists a D' such that, for all rounds n and for all replicas i at rounds n and n+1, |[pc(i,n+1)−pc(i,n)]−[gc(n+1)−gc(n)]|<D'.

The consistent time service that is the subject of this invention is preferably performed using the consistent clock synchronization algorithm of the present invention. The consistent clock synchronization algorithm proceeds in rounds. A round is a period of time in which the mechanisms retrieve the physical hardware clock values, exchange messages, reset the clock offset and decide on the consistent clock value for the group. A new round of clock synchronization is started for each clock-related operation. Within a single thread, all clock-related operations are naturally sequential; a thread cannot start a new round of the consistent clock synchronization algorithm before the current round completes. The scheduling algorithm of the replication infrastructure determines whether or not there are multiple concurrent consistent clock synchronizations in progress for different threads (see, e.g., P. Narasimhan, L. E. Moser, and P. M. Melliar-Smith. "Enforcing determinism for the consistent replication of multithreaded CORBA applications", in Proceedings of the IEEE 18th Symposium on Reliable Distributed Systems, pages 263-273, Lausanne, Switzerland, October 1999, incorporated herein by reference; and R. Jimenez-Peris and S. Arevalo, "Deterministic scheduling for transactional multithreaded replicas", in Proceedings of the IEEE 19th Symposium on Reliable Distributed Systems, pages 164-173, Nurnberg, Germany, October 2000, incorporated herein by reference).

The consistent clock synchronization algorithm of the present invention is described herein for active replication; modifications for passive replication and semi-active replication are described as well. The general concept is that the replica in the group, whose consistent clock synchronization (CCS) message containing a proposed group clock value for a round is ordered and delivered first, decides on the group clock value for that round. The replica that decides the group clock value is referred to herein as the synchronizer for the round. For primary/backup replication strategies, the synchronizer is the primary replica. Each replica maintains a clock offset value to stay in synchronization with the clock readings for the group, even if the synchronizer changes for different rounds. The clock offset value is re-adjusted, if necessary, for each round of executing the consistent clock synchronization algorithm.

In the consistent clock synchronization algorithm the replicas in the group may compete to become the synchronizer for the round. In a round, the group clock is set to the local clock proposed for the group clock by the winner (the synchronizer) of that round. In the initial round, the group clock is initialized to the synchronizer's local clock value, which is the value of the physical hardware clock of that replica. In each subsequent round, the group clock is set to the synchronizer's local clock value, which is the sum of its physical hardware clock value and its offset of the group clock from the local clock in the previous round.

If the message containing the local logical clock value that is proposed for the group clock is delivered to any non-faulty replica, it will be delivered to all non-faulty replicas. Because at least one replica in the group is non-faulty during the consistent clock synchronization round, the consistent clock synchronization algorithm will determine a consistent group clock value for that round.

For the primary/backup approach, if the primary replica fails during the round before it sends the consistent clock synchronization message or if it fails during the round after it sends the consistent clock synchronization message but its consistent clock synchronization message is not delivered to any non-faulty replica, then the new primary replica will send a consistent clock synchronization message.

2. Clock Synchronization Example

Figure 2:
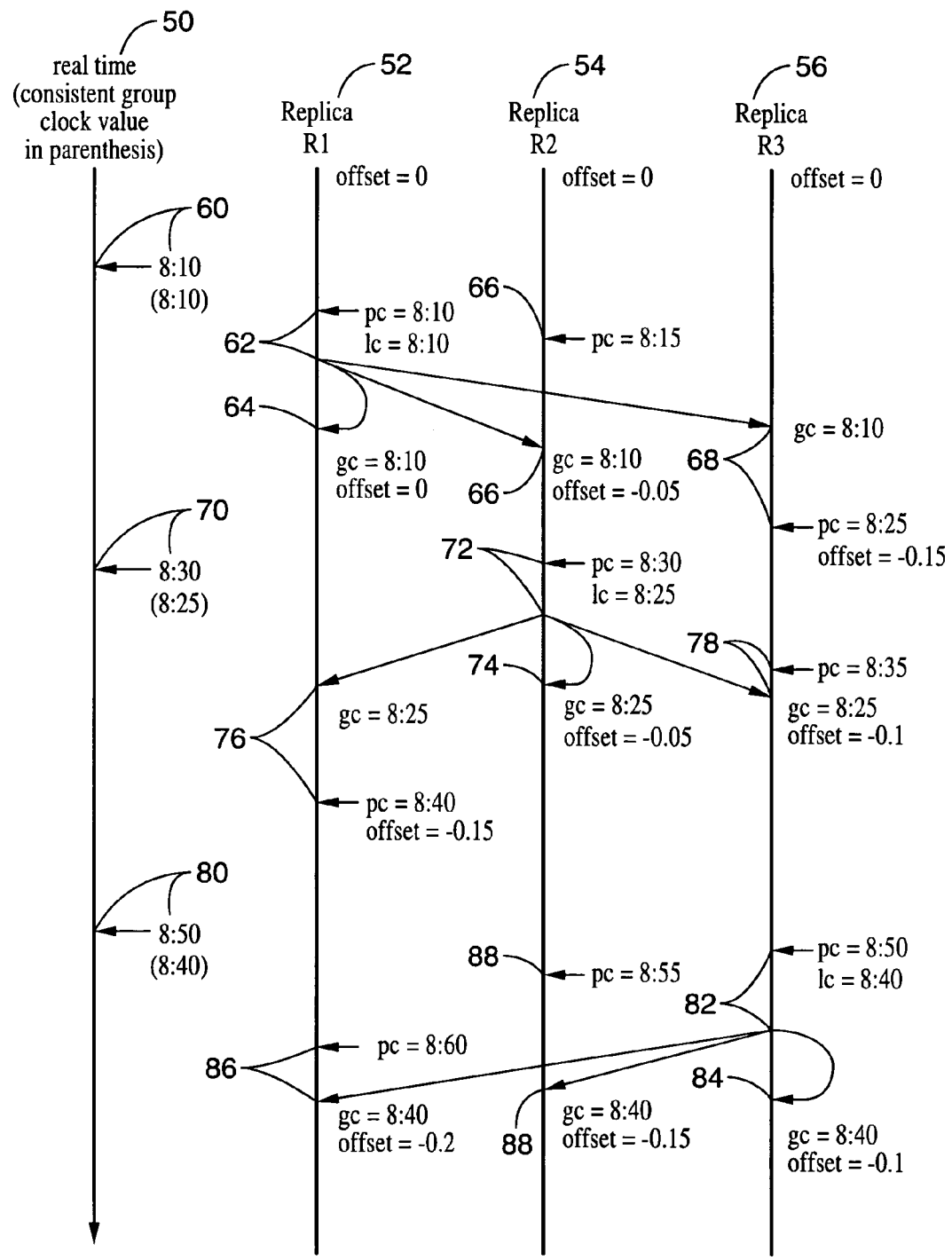
FIG. 2 is a diagram of an example illustrating synchronizing the state of a recovering replica with the appropriate initialization of the new clock according to an aspect of the present invention.

FIG. 2 illustrates an example of the consistent clock synchronization algorithm of the present invention showing the progress of real time 50 and three replicas, R1 52, R2 54 and R3 56. All three replicas preferably start with a timer offset value of zero.

At real time 8:10 60, replica R1 initiates a round of the consistent clock synchronization algorithm 62. Replica R1 reads its physical hardware clock and sets pc=8:10. It then adds pc and offset to obtain its local logical consistent clock lc=8:10, which it multicasts to all of the replicas in a consistent clock synchronization (CCS) message. After a short delay, replica R1 receives its own CCS message 64 and determines that gc=8:10 and then subtracts pc from gc to obtain its timer offset value =0. Replica R2 reads its physical hardware clock and sets pc=8:15, and then receives the multicast CCS message, from which it determines that gc=8:10 Δ. Replica R2 then subtracts pc from gc to obtain its offset =−0.05. Replica R3 receives the multicast CCS message 68, from which its determines that gc=8:10, and reads its physical hardware clock and sets pc=8:25 68. It then subtracts pc from gc to obtain its offset =gc−pc=−0.15.

A short time later 70, at real time 8:30, replica R2 initiates a round of the consistent clock synchronization algorithm 72. Replica R2 reads its physical clock and sets pc=8:30, and then adds pc and offset to obtain lc=8:25, which it multicasts to all of the replicas. After a short delay, replica R2 receives its own multicast CCS message 74, from which it determines that gc=8:25. Replica R2 then subtracts pc from gc to obtain its offset =−0.05. Replica R1 receives the multicast CCS message 76, from which it determines that gc=8:25, and then reads its physical hardware clock and sets pc=8:40. Replica R1 then subtracts pc from gc to obtain its offset =−0.15. Replica R3 reads its physical hardware clock and sets pc=8:35, and receives the multicast CCS message 78 from which it determines that gc=8:25. Replica R3 then subtracts pc from gc to obtain its offset =−0.1.

At real time 8:50 80, replica R3 initiates a round of the consistent clock synchronization algorithm 82. Replica R3 reads its physical hardware clock and sets pc=8:50. It then adds pc and offset to obtain lc=8:40, which it multicasts to all of the replicas. After a short delay, replica R3 receives its own multicast CCS message 84, from which it determines that gc=8:40. Replica R3 then subtracts pc from gc to obtain its offset =−0.1. Replica R1 reads its physical hardware clock and sets pc=8:60. It then receives the multicast CCS message 86, and determines that gc=8:40. Replica R1 subtracts pc from gc to obtain its offset =−0.2. Similarly, replica R2 reads its physical hardware clock and sets pc=8:55, and receives the multicast CCS message 88 from which it determines that gc=8:40. Replica R3 then subtracts pc from gc to obtain its offset =−0.15.

3. Data Structures 3.1 Synchronization Messages

The consistent clock synchronization algorithm of the present invention requires the sending of a message containing synchronization information, herein referred to as a Consistent Clock Synchronization (CCS) message, to the replicas in the group.

Each CCS message contains a common fault-tolerant protocol message header. The header preferably contains the following fields:

msg_type: The type of message, (i.e. CCS).

src_grp_id: The source, or sending, group identifier.

dst_grp_id: The destination, or receiving, group identifier. For a CCS message, the source group identifier and the destination group identifier are the same.

conn_id: The identifier that uniquely determines a connection that has been established between the source group and the destination group.

msg_seq_num: The sequence number of the message sent on the connection. For CCS messages, this field contains the CCS round number. A CCS round number n means that this is the nth round of the consistent clock synchronization algorithm conducted by the group (for all threads in a replica in the group).

For a regular user message, the src_grp_id, dst_grp_id and conn_id uniquely determine a connection within the distributed system. The msg_seq_num uniquely determines a message within the connection. These fields together constitute the message identifier.

The payload of the CCS message contains two parts:

Sending thread identifier: The identifier of the sending thread.

Local clock value being proposed for the group clock: The sum of the physical hardware clock value and the clock offset at the replica.

3.2 Local Data Structures

For each replica, this embodiment of the consistent clock synchronization algorithm employs the following local data structures:

my_physical_clock_val: The variable that stores the physical hardware clock value read at the beginning of each round of the consistent clock synchronization algorithm.

my_clock_offset: The clock offset value of the group clock value from the physical hardware clock value of the local replica. The clock offset value is set once for each consistent clock synchronization round, as the difference between the group clock value for the round and my_physical_clock_val of the local replica. It is used to calculate the local clock value that any thread in the replica proposes for the group clock in the next round.

my_round_number: The consistent clock synchronization round number for the replica. This number is used to perform duplicate detection and to match the clock-related operation with the corresponding CCS message in the same round. In active replication, all replicas compete for sending the CCS message and, therefore, duplicate detection is required during normal operation. In passive or semi-active replication, duplication detection is not required during normal operation but is required for recovery from a fault.

my_common_input_buffer: A buffer that queues CCS messages for a slow replica when the thread that will perform the same logical operation has not been created yet. In this case, the mechanisms cannot find a matching CCS_handler (defined below) to process the received CCS messages.

CCS_handler: The consistent clock synchronization handler object. There is one such handler object for each thread. Each CCS_handler object contains the following member variables and member methods:

my_thread_id: The identifier of the thread.

my_input_buffer: The buffer that stores the received CCS messages sent by the peer replicas and/or the local replica. Even though all of the clock-related operations in a thread are sequential, slower replicas might still need to queue one or more CCS messages from the faster replicas. Those messages correspond to the clock-related operations that the local replica has not performed yet. Note that an incoming request can trigger multiple clock-related operations, and that the dedicated timer management thread continuously performs clock-related operations.

get_grp_clock_time( ): The thread invokes this member method for each clock-related operation and passes the local clock value that is being proposed for the group clock as the input parameter to this method. This method invocation blocks until the first CCS message is delivered. The consistent clock value that corresponds to the clock-related operation is returned to the calling thread.

recv_CCS_msg( ): Using this method, the mechanisms append a received CCS message to the input buffer that is targeted for this thread.

4. Consistent Clock Synchronization Algorithm

The consistent clock synchronization algorithm is illustrated by way of example and not limitation in the flowcharts of FIG. 3 through FIG. 8. Each clock-related operation is converted into a CCS message that is multicast to all of the replicas in a group using a reliable ordered multicast protocol. Each CCS message contains in its payload a local logical clock value that the replica is proposing for the consistent group clock value for the round. The clock value contained in the first received CCS message is returned to the application as the consistent group clock value.

4.1 Initialization and Consistent Clock Synchronization

Figure 3:
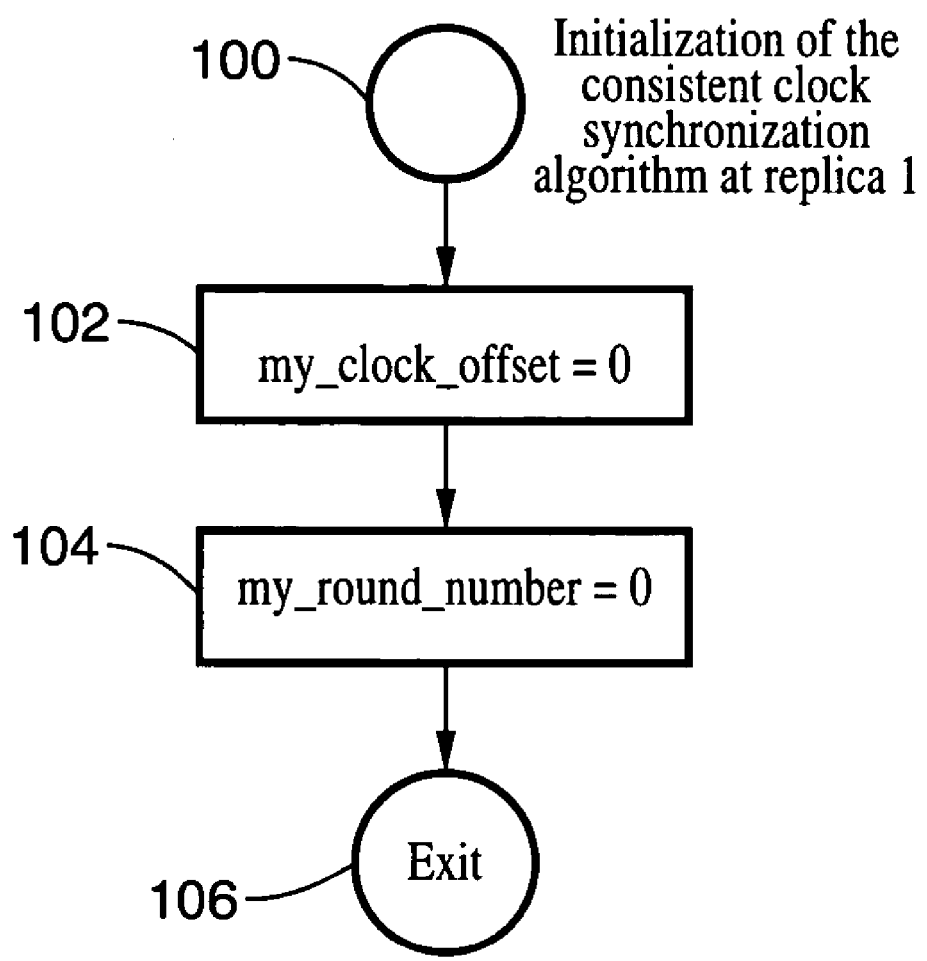
FIG. 3 is a flowchart of initializing the consistent clock synchronization algorithm according to an aspect of the present invention.

Referring to FIG. 3, during initialization 100 of the consistent clock synchronization algorithm, the clock offset value at each replica and the consistent clock synchronization round number are initialized, such as set to zero as per blocks 102 and 104. This means that the CCS message for the first clock-related operation in each replica contains the physical hardware clock value for that replica. After initialization is performed execution exits at block 106.

On initialization of the consistent clock synchronization algorithm:

```
my_clock_offset = 0;
my_round_number = 0;
```

Figure 4:
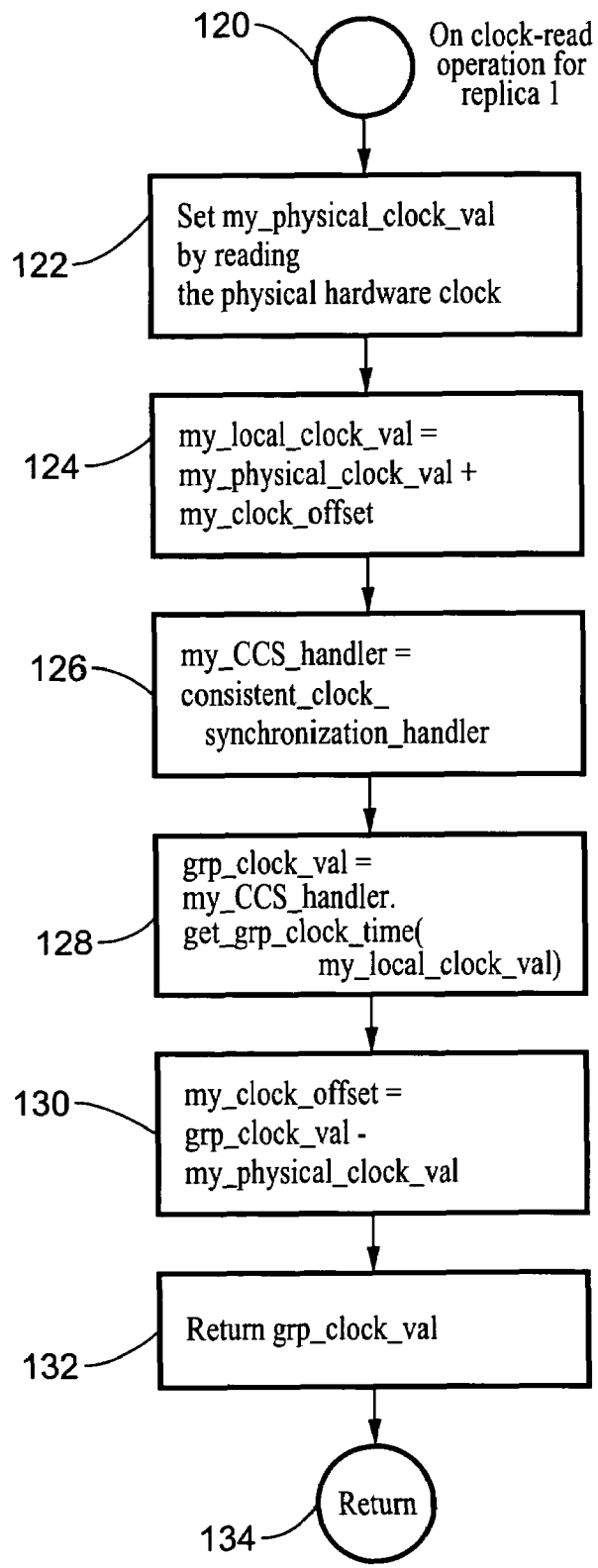
FIG. 4 is a flowchart of the operation of the consistent clock synchronization algorithm according to an aspect of the present invention, shown executing a clock-related operation.

Referring to FIG. 4, on each clock-related operation 120, the physical hardware clock value is retrieved 122 and a local logical clock value is calculated by summing the physical hardware clock value and the clock offset 124. Then, the consistent clock synchronization handler for the thread is retrieved and my_CCS_handler is set to that handler 126 and the get_grp_clock_time( ) method of the handler is invoked, with the local logical clock value as an input parameter, and grp_clock_val is set to the value retrieved 128. This method invocation blocks until the first matching CCS message is delivered. Every replica in the group accepts the local logical clock value in that message as the group clock value (as a result of the reliable ordered multicast of CCS messages). The clock offset is updated by taking the difference of the group clock value and the physical hardware clock value 130. The group clock value is then returned to the replica 132 and the algorithm returns 134.

```
On each clock-related operation:
    my_physical_clock_val = read from physical hardware clock;
    my_local_clock_val = my_physical_clock_val + my_clock_
       offset;
    my_CCS_handler = consistent clock synchronization handler;
    grp_clock_val =
        my_CCS_handler.get_grp_clock_time(my_local_clock_
        val);
    my_clock_offset = grp_clock_val – my_physical_clock_val;
    return grp_clock_val;
```

Figure 5:
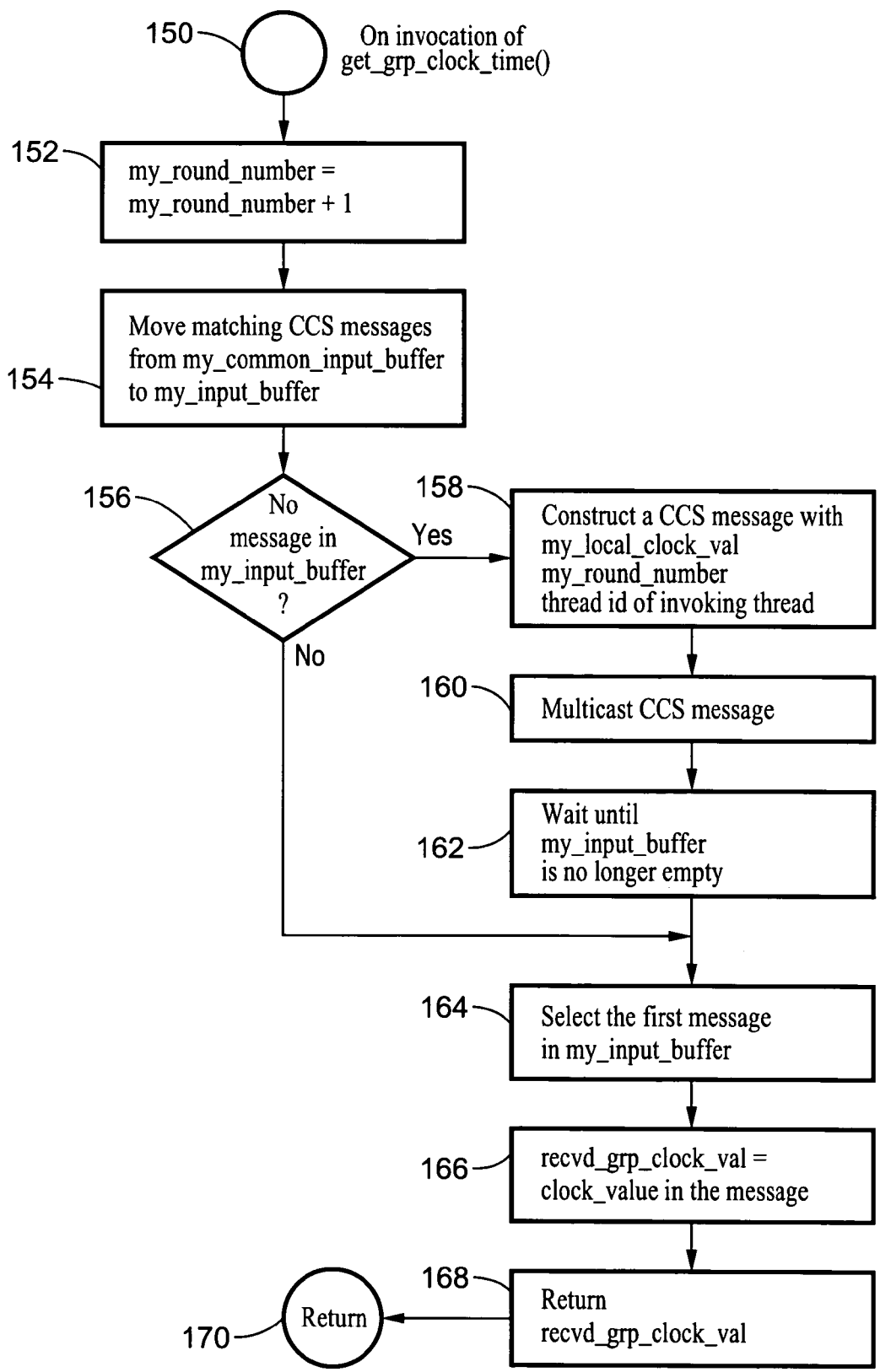
FIG. 5 is a flowchart of the operation of the consistent clock synchronization algorithm according to an aspect of the present invention, shown on invocation of the get_grp_clock_time( ) method.

Referring to FIG. 5, on invocation of the get_grp_clock_time( ) method 150, the round number is incremented each time the method is invoked 152. Any matching CCS messages in the common input buffer for the calling thread that have been received earlier (when the mechanisms could not determine the thread to which those messages should be delivered) are moved from the common input buffer to the local input buffer in the thread 154.

The local input buffer is then checked 156. If the local input buffer is empty, the mechanisms construct a CCS message with the local clock value that is being proposed for the group clock, the round number, and the appropriate thread identifier 158. Then, they send the message using the reliable ordered multicast protocol 160. The calling thread is blocked waiting for the arrival of the first matching CCS message 162.

When the thread is awakened by the arrival of a CCS message or if there is a message in the local input buffer, the mechanisms remove the first CCS message from the local input buffer 164, extract the local clock value that is being proposed as the consistent group clock value 166 and return the consistent group clock value to the application 168. The algorithm then returns 170.

```
On invocation of get_grp_clock time( ) method:
    my_round_number = my_round_number + 1;
    move matching CCS messages from my_common_input_buffer
       to my_input_buffer;
    if no message in my_input_buffer
        construct a CCS message with my_local_clock_val,
            my_round_number and the appropriate thread id;
        multicast CCS message;
        wait until my_input_buffer is no longer empty;
    select the first message in my_input_buffer;
    recvd_grp_clock_val = the consistent clock value in the
        message;
    return recvd_grp_clock_val;
```

Figure 6:
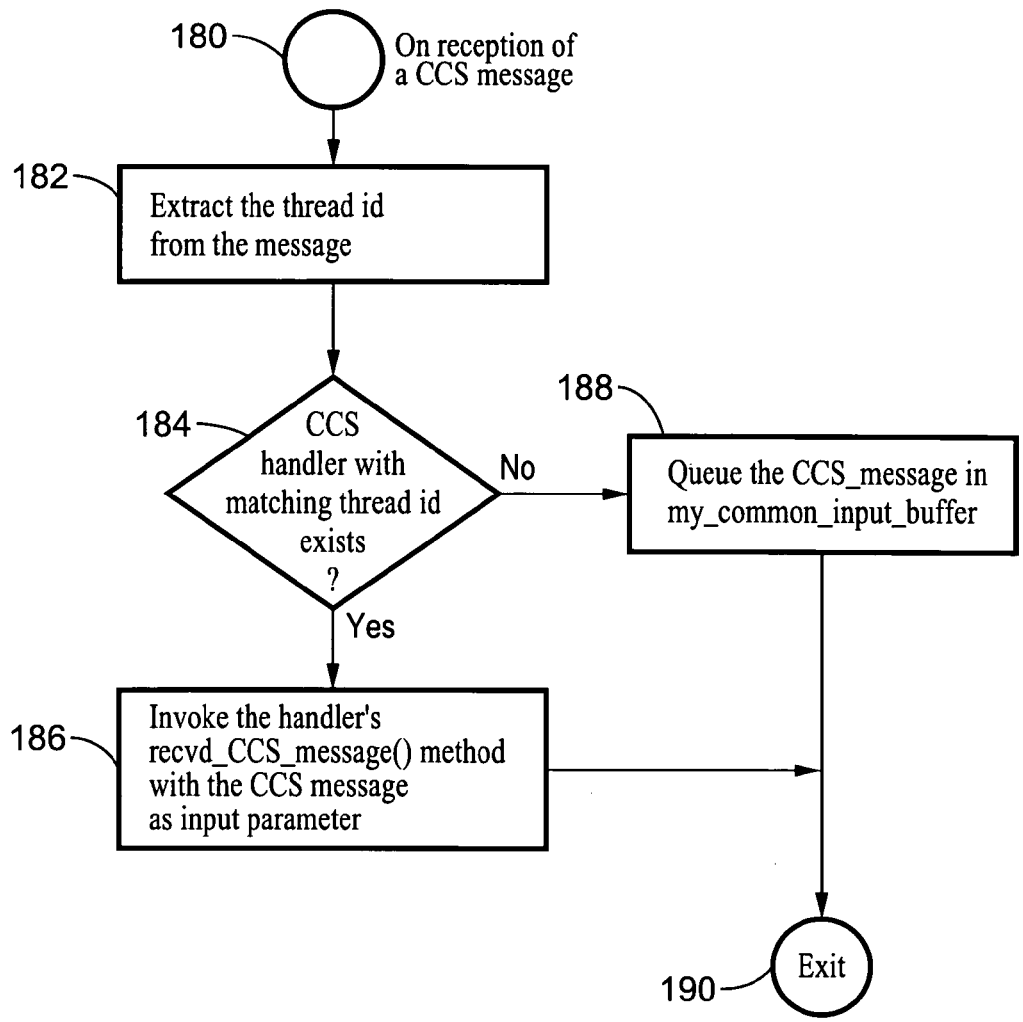
FIG. 6 is a flowchart of the operation of the consistent clock synchronization algorithm according to an aspect of the present invention, shown on receipt of a consistent clock synchronization (CCS) message.

Referring to FIG. 6, on reception of a CCS message 180, the mechanisms extract the sending thread identifier from the message 182 and search for the corresponding CCS_handler object 184. If the handler object is found, the recv_CCS_msg( ) method of the handler object is invoked with the CCS message as an input parameter 186 and the algorithm exits 190. If no handler object is found, the replica has not started the thread yet and the CCS message is queued in the common input buffer 188 and the algorithm exits 190.

```
on reception of a CCS message:
    extract the sending thread id from the message;
    if a CCS handler object with a matching thread id is found
        invoke the handler's recv_CCS_msg( ) method with the
            CCS message as an input parameter;
    else
        queue the CCS message in my_common_input_buffer;
```

Figure 7:
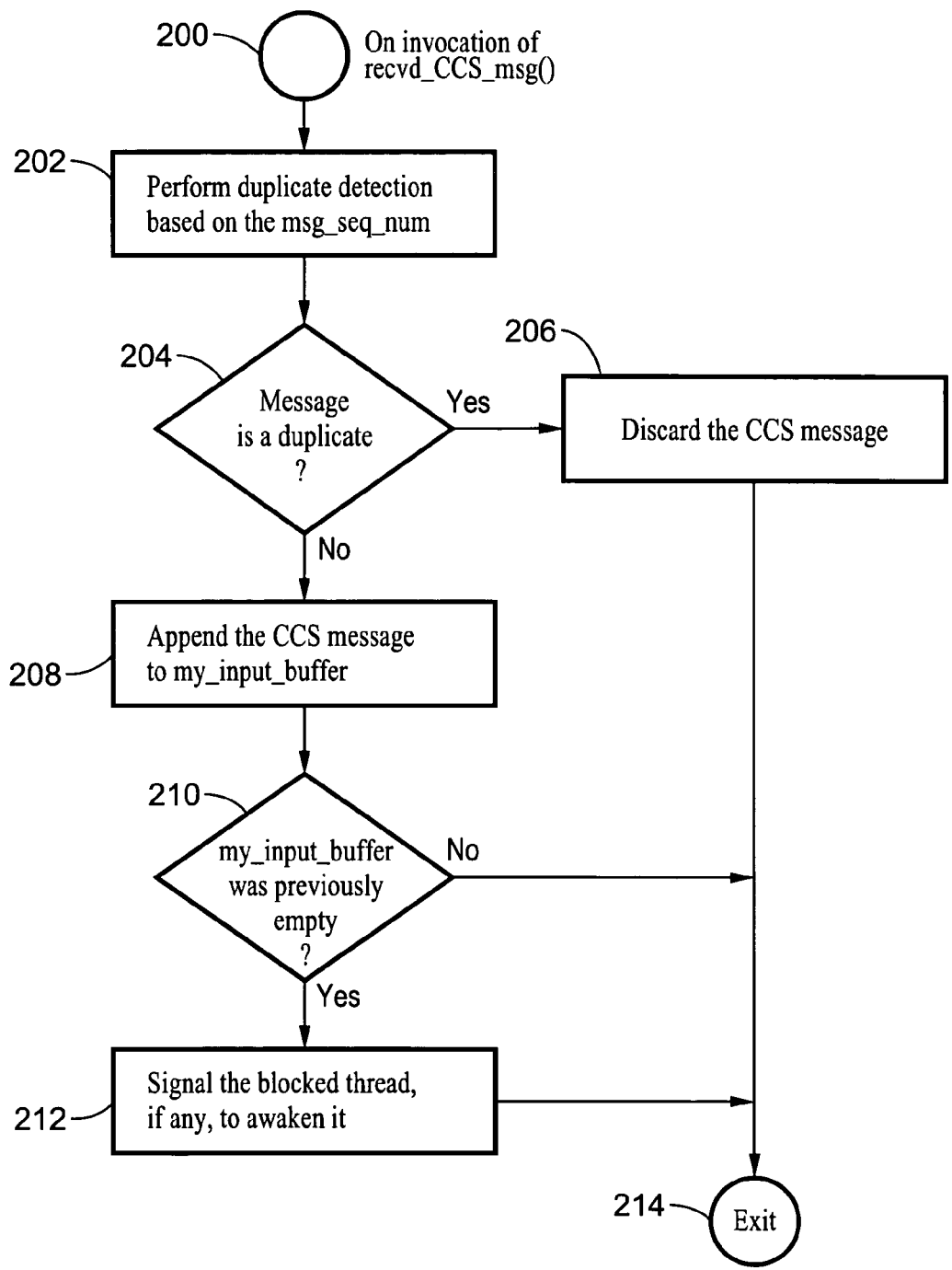
FIG. 7 is a flowchart of the operation of the consistent clock synchronization algorithm according to an aspect of the present invention, shown on invocation of the recv_CCS_msg( ) method.

FIG. 7 illustrates invocation of the recv_CCS_msg( ) method 200. Duplicate detection is performed based on the msg_seq_num in the CCS message 202 to see if it is a duplicate 204. If the CCS message is a duplicate, it is discarded 206 and the algorithm exits 214. If it is not a duplicate, the message is appended to the local input buffer 208. If the local input buffer was previously empty 210, there might be a thread that has been blocked waiting for the CCS message in which case a signal is sent to wake up a potential blocked thread 212 and the algorithm exits 214.

```
on invocation of the recv_CCS_msg( ) method:
    perform duplicate detection based on msg_seq_num
        information;
    if the CCS message is a duplicate,
        discard the CCS message;
    else
        append the CCS message to my_input_buffer;
        if my_input_buffer was previously empty,
            signal the blocked thread, if any, to awaken it;
```

4.2 Integration of New Clocks

Adding a new replica or restarting a failed replica introduces a new clock. The replication infrastructure ensures that the state transfer, or the synchronization of replica state, occurs when the group reaches a quiescent state, such as when the existing replicas in the group are not involved in any processing, including clock-related operations. Therefore, adding a new replica (a new clock) does not interfere with normal consistent clock synchronization.

It is important to ensure that the newly added clock maintains the property that the group clock is increasing monotonically. During the recovery process, the new clock must be initialized properly, based on the existing group clock.

Figure 8:
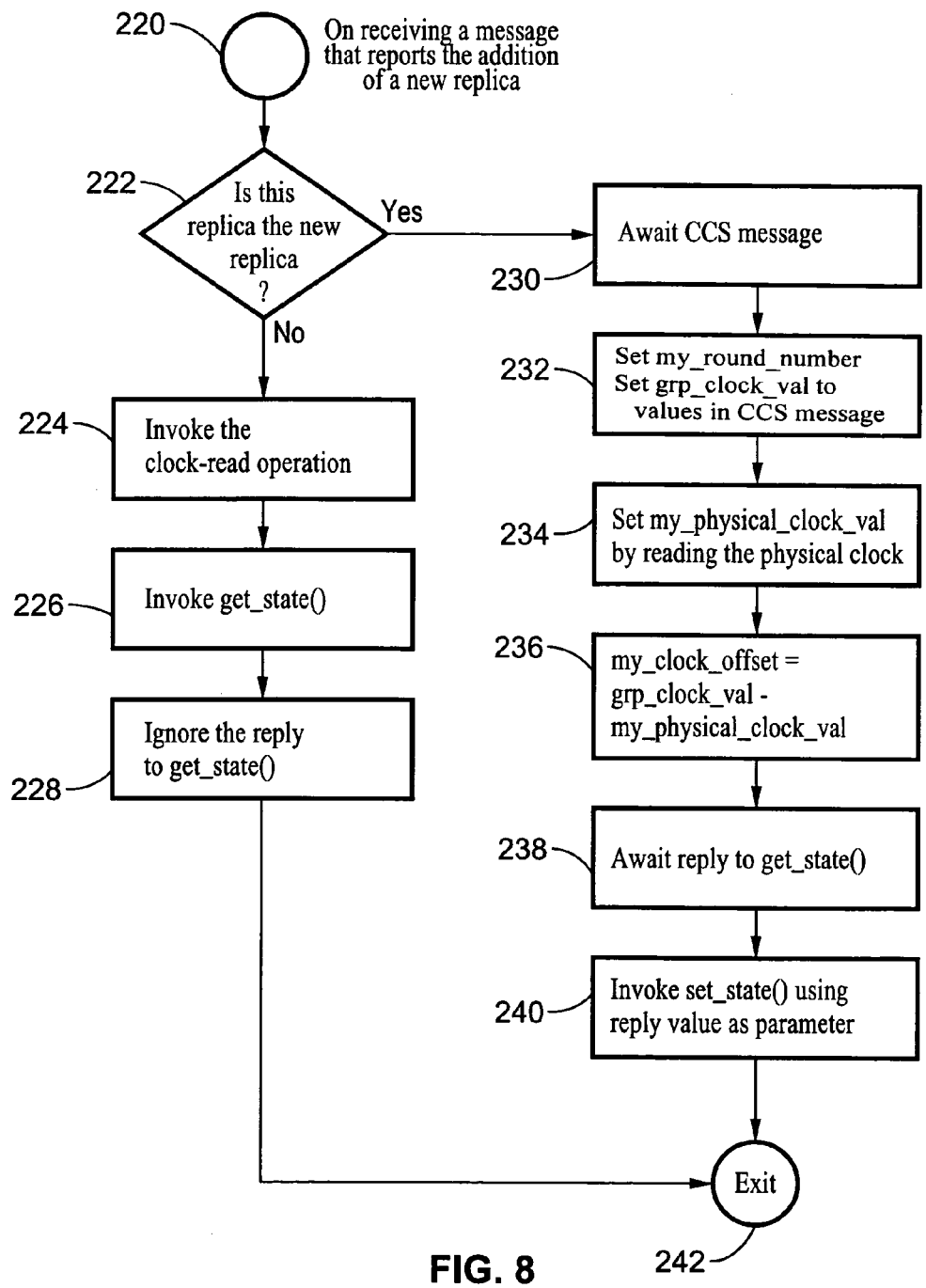
FIG. 8 is a flowchart of the operation of the consistent clock synchronization algorithm according to an aspect of the present invention, showing steps taken on reception of a message that announces the addition of a new replica.

FIG. 8 illustrates an example of recovery steps together with the necessary mechanisms to initialize the recovering replica. When adding a new replica (equivalent to adding a new clock), a synchronization point must be chosen for the state transfer from the existing replicas to the recovering replica. It is generally achieved by a reliable ordered multicast GET_STATE message, which takes a checkpoint.

On reception of a message that reports the addition of a new replica 220, each replica determines whether it is the new replica 222. Replicas that are not the new replica must transfer their consistent group clock value and their state to the new replica. This is achieved by, first, invoking a clock-related operation 224 that generates a CCS message to synchronize the clocks of all of the replicas, including the new replica. The replica then invokes a get_state( ) operation 226. The reply to the get_state( ) operation contains the state of the replica, which is multicast to all replicas and is used to set the state of the new replica. The existing replicas ignore the reply to the get_state( ) operation 228 and exit at block 242.

The new replica first awaits reception of the first CCS message multicast by an existing replica 230. It sets my_round_number and grp_clock_val to the values contained in the CCS message 232, and sets my_physical_clock_val by reading its physical clock 234. It sets my clock_offset to the difference between grp_clock_val and my_physical_clock_val 236.

Next, the new replica awaits reception of the reply to the get_state( ) operation 238. That reply contains the state of the other replicas. The new replica constructs an invocation of set_state( ), using the reply to get_state( ) as the parameter to set_state( ) 240, so as to set the state of the new replica to match the state of the existing replicas. The new replica then exits 242, and subsequently processes further messages in exactly the same way that existing replicas do.

```
on receiving at replica i the message
    that reports the addition of a new replica:
    if I am the new replica,
        await CCS message;
        on receiving CCS message:
            set my_round_number
                to corresponding value in CCS message;
            set grp_clock_val to corresponding value
                in CCS message;
            set my_physical_clock_val
                by reading the physical hardware clock;
            my_clock_offset =
                grp_clock_val − my_physical_clock_val;
            await reply to invocation of get_state( );
            on receiving reply to invocation of get_state( )
                invoke set_state( ) using reply value as parameter;
    else
        invoke the clock-related operation;
        invoke get_state( );
        ignore reply to get_state( );
```

Note that, for passive and semi-active replication, only the primary replica sends CCS messages. If the primary replica fails and a backup replica assumes the role of the primary replica, that backup replica might find that it has already received a CCS message from the primary replica and, consequently, that it does not need to send the CCS message but, rather, uses the consistent clock value contained in the CCS message that it received.

Also note that the winner of a consistent clock synchronization round is not necessarily the first replica in the group that conducted the clock-related operation. The order in which concurrent messages are multicast depends on the strategy that the group communication protocol uses. In Totem (see, e.g., L. E. Moser, P. M. Melliar-Smith, D. A. Agarwal, R. K. Budhia and C. A. Lingley-Papadopoulos, "Totem: A fault-tolerant multicast group communication system", Communications of the ACM, vol. 39, no. 4, April 1996, pp. 54-63, incorporated herein by reference) for example, the winner is determined by the relative ordering of the send request and the token visit, together with the position of the replica on the logical ring. Nevertheless, a faster replica has a higher probability of becoming the winner of a consistent clock synchronization round.

It should also be noted that the consistent group clock can exhibit drift from real time over long periods of time, both because of the drift of the physical hardware clocks and because of the communication and processing delay. One strategy for reducing the drift is to increase the value of my_clock_offset by a mean delay each time that value is calculated to compensate for that delay. Such a compensation can significantly reduce the drift but is necessarily only approximate. A more aggressive strategy involves NTP, GPS or some other time source that might have a transient skew from real time but that has no drift. Each time a physical hardware clock is read and a proposed consistent clock is calculated at the start of a round, a small proportion of the difference between the "real time" and the proposed consistent clock is added to the proposed consistent clock. This introduces a small but repeated bias towards "real time" that can compensate for the drift in the group clock.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of maintaining clock consistency in a fault-tolerant distributed system for a group of replicas having physical hardware clocks, comprising:
    executing a time service handler for accessing a physical hardware clock;
    establishing a single consistent group clock value within said time service handler for a group of replicas to be used in place of said physical hardware clock value; and
    returning from said time service handler with said group clock value;
    wherein said time service handler computes and stores a clock offset value as the difference between the physical hardware clock value and the most recent determination of said consistent group clock value; and
    wherein said clock offset value is updated in response to establishing a consistent group clock value.

2. A method as recited in claim 1, wherein said replicas in said group receive a single consistent group clock value while at least one of said replicas continues to operate.

3. A method as recited in claim 1, wherein in response to successive executions of said time service handler by said replicas in said group for accessing said physical hardware clocks, the consistent group clock values returned to said replicas in said group are monotonically increasing.

4. A method as recited in claim 1, wherein in response to successive executions of said time service handler by said replicas in said group, the increment, skew, and drift of the consistent group clock value from one reading to the next is bounded.

5. A method as recited in claim 1, wherein a replica determines a logical local clock value as a proposed consistent group clock value for communication to other replicas in said group of replicas, by adding said clock offset value to said physical hardware clock value read from hardware.

6. A method as recited in claim 5, wherein said proposed consistent group clock value is communicated to other replicas of said group by multicasting said proposed consistent group clock value to all of the replicas in said group.

7. A method as recited in claim 6, wherein said multicasting is performed according to a reliable ordered multicast protocol which ensures that all replicas receive the same messages in the same order, and that a message is either delivered to all of the replicas in said group or to none of them.

8. A method as recited in claim 6, wherein the first consistent clock synchronization message being multicast contains a proposed consistent group clock value for that reading equal to the physical hardware clock value for use by other replicas in said group of replicas as said consistent group clock value for that reading.

9. A method as recited in claim 5:
further comprising joining said group of replicas by a new replica or repaired replica which receives consistent clock synchronization information upon joining;
wherein said new or repaired replica can subsequently participate in the determination of group clock values.

10. A method as recited in claim 1, wherein said establishing of a single consistent group clock value within said time service handler comprises:
reading a physical clock value in response to a clock operation performed by said time service handler for a thread of a given replica;
determining a local logical clock value for said given replica by adding a clock offset value to said physical clock value;
sending a clock synchronization message to replicas in said group of replicas, which proposes said local logical clock value as a consistent group clock value, when no other clock synchronization messages for the calling thread have been received;
extracting said local clock value from a received clock synchronization message as a consistent group clock value; and
updating said clock offset value for said given replica to the value of the consistent group clock value less the physical clock value.

11. A method of maintaining clock consistency for a group of replicas having physical hardware clocks and operating in a fault-tolerant distributed system, comprising:
reading a physical clock value for a given replica in response to a clock operation for a thread;
determining a local logical clock value for said given replica by adding a clock offset value to said physical clock value;
proposing said local logical clock value as a group clock value within a clock synchronization message sent to replicas in said group of replicas when no other clock synchronization messages for the calling thread for this reading of the physical clock value have been received;
extracting said local logical clock value from a received clock synchronization message which is established as a group clock value that is consistent across said group of replicas;
updating said clock offset value for said given replica to the value of the group clock value less the physical clock value; and
returning said group clock value to said thread of said given replica.

12. A method as recited in claim 11, wherein the succession of said group clock values established for said thread of said given replica is monotonically increasing.

13. A method as recited in claim 11, wherein said clock synchronization message includes a common fault-tolerant protocol message header.

14. A method as recited in claim 11, wherein said clock synchronization message is sent to replicas of said group by multicasting according to a reliable ordered multicast protocol which ensures that all replicas receive the same messages in the same order, and that a message is delivered either to all of the replicas in the group or to none of them.

15. A method as recited in claim 11, wherein said process of reading, determining, proposing, extracting, and updating is performed within a time service handler which is executed in response to said clock operation for said thread of said given replica.

16. A method as recited in claim 11, wherein said extracted local logical clock value may be received from said given replica if a clock synchronization message from other replicas is not received first.

17. A method as recited in claim 11, further comprising initializing said clock offset value upon commencing execution of each replica in said group of replicas.

18. A method as recited in claim 11, wherein said extracting of said local logical clock value from said clock synchronization message comprises:
extracting a sending thread id from said clock synchronization message;
queuing said clock synchronization message in an input buffer associated with said thread id;
extracting said local logical clock value from said clock synchronization message; and
setting said group clock value to said local logical clock value.

19. A method as recited in claim 11, wherein said local logical clock value proposed within said clock synchronization message as sent by said primary replica establishes said group clock value when executing passive and semi-active replication strategies.

20. A method as recited in claim 11, wherein said local logical clock value proposed within said clock synchronization message is established as said group clock value in response to the order that the clock synchronization message is sent to replicas in said group when executing active replication strategies.

21. A method as recited in claim 11, wherein the process of reading, determining, proposing, extracting, and updating is performed in successive rounds identified by a round number, to present a consistent view of the clock for the replicas in the group.

22. A method as recited in claim 21, wherein said clock synchronization message contains a proposed group clock value, group identifier, thread identifier, and said round number.

23. A method as recited in claim 22, wherein said thread executing said clock operation is blocked waiting for the arrival of a first matching clock synchronization message.

24. A method as recited in claim 23, wherein said clock synchronization message for said thread matches if it has the same round number.

25. A method as recited in claim 21, wherein a new round of clock synchronization is started for each clock-related operation.

26. A method as recited in claim 25, further comprising initializing a round number value upon commencing replica execution.

27. A method as recited in claim 25, wherein said round number is utilized for detecting duplicate clock synchronization messages under active replication strategies.

28. A method as recited in claim 25, wherein said round number is utilized for matching the clock-related operation of a thread with the corresponding clock synchronization message.

29. A method as recited in claim 25, wherein said proposed local logical clock value of a synchronizer replica is selected for a given round to determine the group clock value for said group of replicas.

30. A method as recited in claim 29, wherein said synchronizer comprises the primary replica in systems based on a primary/backup replication strategy.

31. A method as recited in claim 29, wherein said replicas in said group compete to become said synchronizer for the given round in systems based on an active replication strategy.

32. A method as recited in claim 31:
wherein said replicas compete to win a given round in response to the order of delivering said clock synchronization message to said group of replicas;
wherein said replica whose clock synchronization message is delivered first to said group of replicas in a round of clock synchronization messages is the synchronizer that establishes the group clock value which is consistent across the group of replicas.

33. A method as recited in claim 32:
wherein during the initial clock synchronizing round, said group clock value is initialized to the local logical clock value of said synchronizer which is equivalent to the value of the physical hardware clock of said synchronizer;
wherein during subsequent clock synchronizing rounds, said group clock value is set to the local logical clock value of the synchronizer as the sum of its physical hardware clock value and its offset of the group clock from the local clock value in the previous round.

34. A method as recited in claim 11, wherein in response to delivering the message containing the local logical clock value proposed for the group clock to a non-faulty replica, it will be delivered to all non-faulty replicas.

35. A method as recited in claim 11, wherein in systems based on a primary/backup approach, failure of the primary replica before it sends said clock synchronization message, or failure of the primary replica after it sends said clock synchronization message but in which said clock synchronization message is not delivered to any non-faulty replica, the new primary replica sends a clock synchronization message.

36. A method as recited in claim 11, wherein said method is applicable to active replication, to both cold and warm passive replication, and to both semi-passive and semi-active replication strategies.

37. A method as recited in claim 11, wherein failure of a replica within said group of replicas does not interfere with the proposal and establishment of a group clock value by non-faulty replicas.

38. A method as recited in claim 11, wherein said method is implemented on top of a replication infrastructure and a group communication system.

39. A method as recited in claim 38, wherein said replication infrastructure and group communication system comprises a reliable ordered multicast protocol that ensures that replicas in said group receive the same messages in the same order, and that a message is delivered either to all of the replicas in said group or to none of them.

40. A method as recited in claim 11, wherein said method is implemented utilizing library interpositioning of clock-related system calls to achieve application transparency.

41. A method of maintaining clock consistency for a group of replicas operating in a fault-tolerant distributed system, said clock consistency maintained as said replicas access their respective physical hardware clocks through a time service handler, comprising:
processing clock synchronization messages that arrive at a given replica from other replicas within said group of replicas;
updating a time offset value for said given replica as the difference between the physical hardware clock value for said given replica and a clock value contained in said clock synchronization message;
determining a local logical clock value from the sum of said physical hardware clock value and said time offset value;
proposing said local logical clock value by said given replica as a group clock value for replicas in said group of replicas by multicasting a clock synchronization message to the replicas in said group of replicas;
establishing said proposed clock value as a group clock value by other replicas in said group of replicas;
updating said clock offset value by each said replica accepting said group clock value; and
returning said group clock value to said given replica from said time service handler.

42. A method as recited in claim 41, wherein said clock synchronization message contains a proposed group clock value, a group identifier, and a sequence number of the message sent on the connection.

* * * * *